United States Patent
Seki et al.

(10) Patent No.: US 9,825,295 B2
(45) Date of Patent: Nov. 21, 2017

(54) POSITIVE ELECTRODE ACTIVE MATERIAL AND LITHIUM-ION SECONDARY BATTERY

(71) Applicant: TDK CORPORATION, Tokyo (JP)

(72) Inventors: Hideaki Seki, Tokyo (JP); Atsushi Sano, Tokyo (JP); Masaki Sobu, Tokyo (JP); Tomoshi Nakamoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/109,533

(22) Filed: Dec. 17, 2013

(65) Prior Publication Data

US 2014/0170496 A1 Jun. 19, 2014

(30) Foreign Application Priority Data

Dec. 17, 2012 (JP) .................. 2012-274682
Nov. 1, 2013 (JP) .................. 2013-227801

(51) Int. Cl.
*H01M 4/58* (2010.01)
*C01B 25/45* (2006.01)
*H01M 10/052* (2010.01)

(52) U.S. Cl.
CPC .......... *H01M 4/5825* (2013.01); *C01B 25/45* (2013.01); *H01M 10/052* (2013.01)

(58) Field of Classification Search
CPC ... H01M 4/5825; H01M 4/485; H01M 10/052
See application file for complete search history.

(56) References Cited

U.S. PATENT DOCUMENTS

| | | | |
|---|---|---|---|
| 2011/0311868 A1* | 12/2011 | Sano et al. | ..... 429/211 |
| 2013/0153821 A1* | 6/2013 | Evenson | ..... C01B 25/45 |
| | | | 252/182.1 |
| 2014/0004416 A1 | 1/2014 | Sano et al. | |
| 2014/0004417 A1 | 1/2014 | Sano et al. | |

FOREIGN PATENT DOCUMENTS

| | | |
|---|---|---|
| JP | 4314859 B2 | 5/2009 |
| JP | A-2009-231206 | 10/2009 |
| JP | A-2013-206562 | 10/2013 |
| JP | A-2013-206563 | 10/2013 |
| JP | A-2013-206564 | 10/2013 |
| WO | 2012/133731 A1 | 10/2012 |
| WO | WO 2012/133730 A1 | 10/2012 |

OTHER PUBLICATIONS

Apr. 24, 2014 Notification of Reason for Rejection cited in Japanese Appliation No. 2013-227801.
Nagamine et al., "Selective Synthesis of Lithium Ion-Conductive β-LiVOPO$_4$ Crystals via Glass-Ceramic Processing," *Journal of American Ceramic Society*, Dec. 2008, vol. 91, Issue 12, pp. 3920-3925.

* cited by examiner

*Primary Examiner* — Patrick Ryan
*Assistant Examiner* — Victoria Lynch
(74) *Attorney, Agent, or Firm* — Oliff PLC (57) ABSTRACT

A positive electrode active material contains a compound represented by a chemical formula LiVOPO$_4$. A crystal system of the compound is an orthorhombic system, and the amount of tetravalent V of the compound is 27.7 mass % or more and 28.2 mass % or less.

6 Claims, 3 Drawing Sheets

POSITIVE ELECTRODE ACTIVE MATERIAL AND LITHIUM-ION SECONDARY BATTERY

CROSS-REFERENCE TO RELATED APPLICATION

This application is based on Japanese Patent Application No. 2012-274682 filed with the Japan Patent Office on Dec. 17, 2012, the entire content of which is hereby incorporated by reference.

BACKGROUND

1. Technical Field

The present disclosure relates to a positive electrode active material and a lithium ion secondary battery.

2. Related Art

Conventionally, layered compounds such as $LiCoO_2$ and $LiNi_{1/3}Mn_{1/3}CO_{1/3}O_2$ and spinel compounds such as $LiMn_2O_4$ have been used as active materials for positive electrode materials of lithium ion secondary batteries. In recent years, a compound with an olivine structure typified by $LiFePO_4$ has attracted attention. It has been known that a positive electrode material with an olivine structure has high thermal stability at high temperatures and therefore has high safety. However, a lithium ion secondary battery using $LiFePO_4$ has a disadvantage of low energy density due to its charging/discharging voltage as low as 3.5 volts. In view of this, $LiCoPO_4$, $LiNiPO_4$, and the like have been suggested as a phosphate-based positive electrode material that can achieve high charging/discharging voltage. At present, however, sufficient capacity is not yet obtained in a lithium ion secondary battery using such a positive electrode material. Among phosphate-based positive electrode materials, $LiVOPO_4$ has been known as a compound that can achieve a charging/discharging voltage as high as 4 volts. However, a lithium ion secondary battery using $LiVOPO_4$ has not yet achieved sufficient discharge capacity or rate characteristic (see, for example, Japanese Patent No. 4314859).

SUMMARY

A positive electrode active material contains a compound represented by a chemical formula $LiVOPO_4$. A crystal system of the compound is an orthorhombic system, and the amount of tetravalent V of the compound is 27.7 mass % or more and 28.2 mass % or less.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a positive electrode active material that can achieve excellent discharge capacity and rate characteristic of a lithium ion secondary battery, and a lithium ion secondary battery containing this positive electrode active material.

A positive electrode active material according to an embodiment of the present disclosure (the present positive electrode active material) contains a compound represented by a chemical formula $LiVOPO_4$. A crystal system of the compound is an orthorhombic system, and the amount of tetravalent V of the compound is 27.7 mass % or more and 28.2 mass % or less.

The use of a positive electrode containing the present positive electrode active material can improve the capacity and the rate characteristic of the lithium ion secondary battery as compared with the use of the conventional $LiVOPO_4$.

It is considered that the lithium ion secondary battery with the present positive electrode active material is capable of smooth intercalation and deintercalation of Li along with charging and discharging. The valence of V of the positive electrode active material $LiVOPO_4$ is generally tetravalent. The valence control for the amount of V of the positive electrode active material $LiVOPO_4$ has not been examined so far. The present positive electrode active material (or a part of the present positive electrode active material) contains trivalent or pentavalent V. It is considered that this structural characteristic produces the distortion in the crystal structure of the positive electrode active material, thereby facilitating the intercalation and deintercalation of Li. In other words, it is considered that since the movement of Li along with the charging and discharging becomes easy, the lithium ion secondary battery that has the high capacity and the excellent rate characteristic can be achieved.

According to the present disclosure, a positive electrode active material with excellent discharge capacity and rate characteristic, and a lithium ion secondary battery containing this positive electrode active material can be provided.

Preferred embodiments of the present disclosure are hereinafter described with reference to the drawings. The present disclosure is not limited to the embodiments below. Further, structural components described below include structural components that can be easily conceived by a person skilled in the art or structural components that can be substantially the same. Further, the structural components described below can be combined as appropriate.

(Positive Electrode Active Material)

A positive electrode active material according to this embodiment (present positive electrode active material) is a compound represented by a chemical formula $LiVOPO_4$. The crystal system of this compound is an orthorhombic system. The amount of tetravalent vanadium (V) in the present positive electrode active material is 27.7 mass % or more and 28.2 mass % or less.

The amount of tetravalent V in the present positive electrode active material preferably ranges from 27.7 mass % to 27.9 mass %. By adjusting the amount of tetravalent V to be in this range, further excellent discharge capacity and excellent rate characteristic can be obtained.

The tetravalent V in an amount of less than 27.7 mass % may cause distortion of the crystal structure of the present positive electrode active material. When the amount of the tetravalent V is 22.7 mass %, a single phase of the orthorhombic system is observed by X-ray diffraction. When the amount of tetravalent V is 27.5 mass % or less, a triclinic system is observed in addition to the orthorhombic system. In other words, a part of the structure of LiVOPO$_4$ in this embodiment having the orthorhombic system as a fundamental structure has the triclinic system. In this case, the intercalation and deintercalation of Li are not performed smoothly and it becomes difficult to secure sufficient discharge capacity and rate characteristic.

Moreover, the tetravalent V in an amount of 27.6 mass % may cause distortion of the characteristics of the positive electrode active material due to a microscopic structure change. In this case, the he change is not observed in a diffraction pattern in the X-ray diffraction measurement. On the other hand, the tetravalent V in an amount of greater than 28.2 mass % hardly secures sufficient discharge capacity and rate characteristic because of excessive stabilization of the crystal structure of LiVOPO$_4$. In other words, if the crystal structure is stable, Li is stabilized in the crystal lattice. Thus, the Li is released less easily in the charging. As a result, the deterioration in discharge capacity and rate characteristic may occur. Note that the V in the conventional LiVOPO$_4$ is entirely tetravalent and the mass ratio of tetravalent V is 30 mass %. The mass % in this case refers to the proportion of the mass of the tetravalent V when the entire mass of LiVOPO$_4$ is assumed as 100%.

The amount of tetravalent V in this embodiment was obtained by a titration method. After the positive electrode active material LiVOPO$_4$ was dissolved in acid, the titration was conducted using ferrous sulfate ammonium. Alternatively, polarography or potentiometric titration may be used.

The present positive electrode active material preferably has an average primary particle size of 0.05 μm or more and 1 μm or less. Further, the average primary particle size is more preferably 0.08 μm or more and 0.7 μm or less, and much more preferably 0.1 μm or more and 0.3 μm or less. By setting the average primary particle size within the above range, more excellent discharge capacity can be obtained. A method of calculating the average primary particle size of the positive electrode active material may be as follows. First, 100 or more of the primary particles are photographed using a scanning type electron microscope. From the obtained image, the area of each particle is calculated. The calculation results are converted into diameters of circles, whereby the particle sizes are obtained. The obtained particle sizes are averaged, and the average primary particle size is thus obtained.

Further, in the present positive electrode active material, the diffraction peak intensity ratio (I (201)/I (102)) is preferably 2.2 or more and 2.3 or less. I (201) is the peak intensity obtained from (201)-plane existing in 2θ=26.9±0.5 in the X-ray diffraction measurement in which Cu—Kα ray is used. I (102) is the peak intensity obtained from (102)-plane similarly existing in 2θ=27.5±0.5. More excellent discharge capacity and rate characteristic can be obtained by setting the peak intensity ratio within the above range because the lithium ions may be easily dispersed due to the higher orientation of (201)-plane.

A manufacturing method for a positive electrode active material according to this embodiment (present manufacturing method) is hereinafter described. According to the present manufacturing method, the aforementioned present positive electrode active material can be manufactured.

The present manufacturing method includes the following hydrothermal synthesis step and heat treatment step.

(Hydrothermal Synthesis Step)

First, the hydrothermal synthesis step prepares a dispersion mixture of a lithium source, a phosphate source, a vanadium source, water, and a reducing agent by placing them in a reaction vessel (for example, autoclave) having a function of heating and pressing inside. Alternatively, for example, the mixture may be prepared by mixing the phosphate source, the vanadium source, water, and the reducing agent, refluxing the resulting mixture, and then adding the lithium source to the mixture. The reflux allows the step to form the phosphate source and the vanadium source.

As the lithium source, for example, at least one selected from the group consisting of LiNO$_3$, Li$_2$CO$_3$, LiOH, LiCl, Li$_3$PO$_4$, Li$_2$SO$_4$, and CH$_3$COOLi can be used.

As the phosphate source, for example, at least one selected from the group consisting of H$_3$PO$_4$, NH$_4$H$_2$PO$_4$, (NH$_4$)$_2$HPO$_4$ and Li$_3$PO$_4$ can be used.

As the vanadium source, for example, at least one selected from the group consisting of V$_2$O$_5$ and NH$_4$VO$_3$ can be used.

Note that two or more different lithium sources, two or more different phosphate sources, or two or more different vanadium sources may be used in combination.

As the reducing agent, for example, one of hydrazine (NH$_2$NH$_2$.H$_2$O) and hydrogen peroxide (H$_2$O$_2$) may be used, or a mixture thereof may be used. As the reducing agent, hydrazine is particularly preferred. The use of hydrazine tends to drastically increase the discharge capacity and the rate characteristic of the battery as compared with the use of another reducing agent.

In the hydrothermal synthesis step, the mixture in the airtight vessel is heated while pressure is applied to the mixture. Thus, the hydrothermal reaction proceeds in the mixture. Therefore, the orthorhombic system LiVOPO$_4$ as the present positive electrode active material is subjected to the hydrothermal synthesis. The time for heating the mixture while pressure is applied thereto may be adjusted as appropriate in accordance with the amount of mixture.

In the hydrothermal synthesis step, the mixture is preferably heated at 100 to 300° C., more preferably 150 to 250° C. under pressure.

The pressure applied to the mixture in the hydrothermal synthesis step is preferably 0.2 to 1 MPa. If the pressure applied to the mixture is too low, the crystallinity of LiVOPO$_4$ to be obtained finally tends to be low, resulting in that the capacity density is low. If the pressure applied to the mixture is too high, the reaction vessel needs to have high pressure resistance, which increases the manufacturing cost for the positive electrode active material. By setting the pressure applied to the mixture to be in the above range, these tendencies can be suppressed.

(Heat Treatment Step)

The present manufacturing method may include a heat treatment step for further heating the mixture after the hydrothermal synthesis step. The heat treatment step can advance the reaction of the lithium source, the phosphate source, and the vanadium source that have not reacted in the hydrothermal synthesis step, and improve the crystallinity of LiVOPO$_4$ generated in the hydrothermal synthesis step.

In the heat treatment step, the mixture is preferably heated at a temperature of 400 to 700° C. If the heating temperature is too low, the crystallization of LiVOPO$_4$ tends to be insufficient, resulting in that the degree of improvement of the capacity density thereof becomes small. If the heating temperature is too high, the grain of LiVOPO$_4$ tends to grow until the grain diameter becomes too large. This results in that the dispersion of lithium in the positive electrode active material becomes slow and the degree of improvement of the capacity density thereof tends to become small. By setting the heating temperature to be in the above range, these tendencies can be suppressed.

The heat treatment time for the mixture may be 3 to 10 hours. The heat treatment atmosphere for the mixture is not limited as long as the atmosphere contains oxygen. The amount of oxygen should not be too small or too large. Specifically, the amount of oxygen is desirably 10 vol % or more and 65 vol % or less relative to the inert gas such as nitrogen or argon. Moreover, by adjusting the flow rate of the mixture gas to be 1 L or more, preferably 2 L or more, per minute, the replacement of atmosphere in the heat treatment is facilitated. As a result, the effect of atmosphere control is reflected easily.

By adjusting the hydrothermal synthesis condition and the heat treatment condition as appropriate, the amount of tetravalent V of $LiVOPO_4$ can be controlled. This can achieve the desired discharge capacity and rate characteristic. For example, the similar effect can be obtained alternatively by adjusting the ratio of oxygen/nitrogen in the atmosphere mixture gas, performing the heat treatment on a mixture of a precursor and carbon, or performing the heat treatment in an ammonia gas atmosphere. In this manner, strictly controlling the hydrothermal synthesis condition and/or the heat treatment condition is very important in manufacturing the positive electrode active material in the present disclosure.

(Lithium Ion Secondary Battery)

Figure 1:
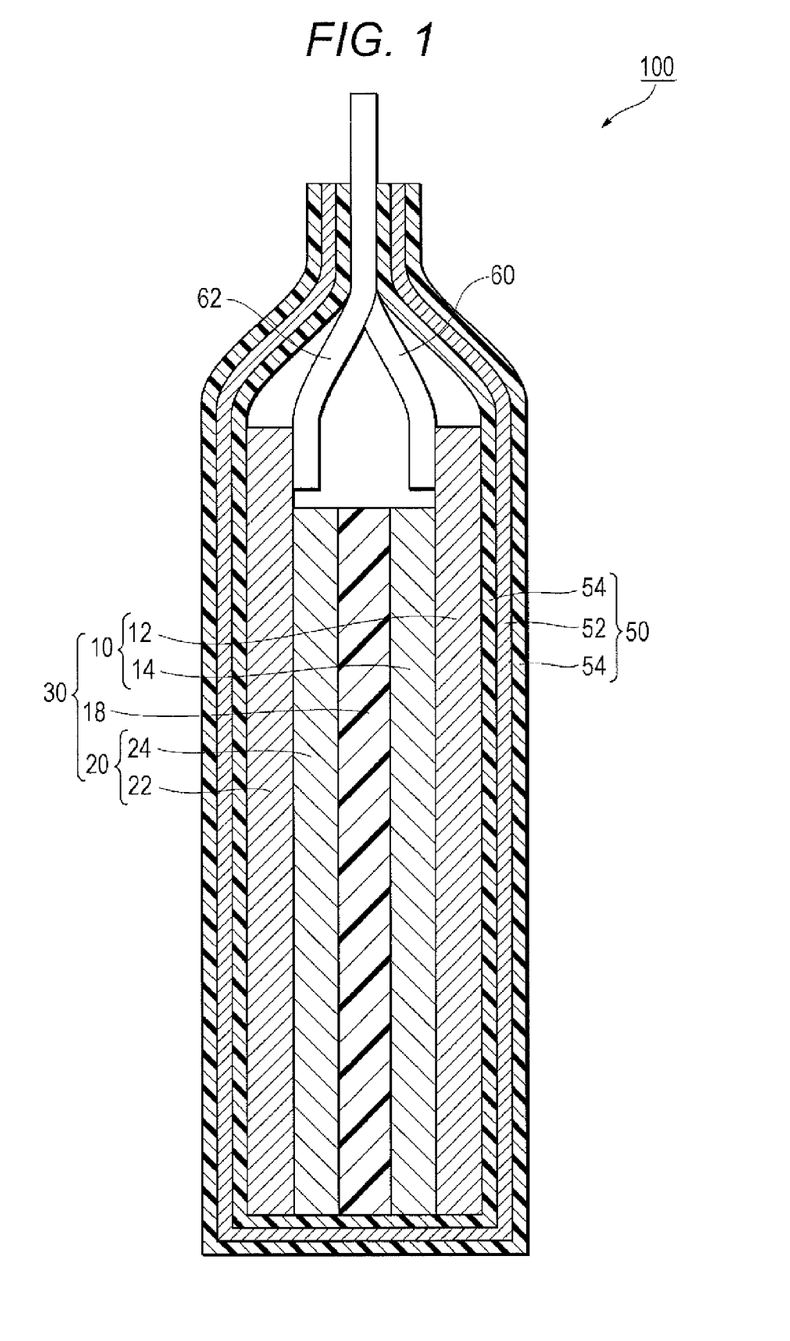
FIG. 1 is a schematic cross-sectional view of a lithium ion secondary battery including a positive electrode active material layer containing a positive electrode active material according to an embodiment of the present disclosure.

Subsequently, an electrode and a lithium ion secondary battery according to this embodiment are briefly described with reference to FIG. 1.

A lithium ion secondary battery 100 mainly includes a power generating element 30, a case 50 for housing the power generating element 30 in a sealed state, and a pair of leads 60 and 62 connected to the power generating element 30.

The power generating element 30 is formed by disposing a pair of an electrode (positive electrode) 10 and an electrode (negative electrode) 20 so as to face each other with a separator 18 interposed therebetween. The positive electrode 10 includes a positive electrode current collector 12 and a positive electrode active material layer 14 provided thereon. The negative electrode 20 includes a negative electrode current collector 22 and a negative electrode active material layer 24 provided thereon. The positive electrode active material layer 14 is in contact with one side of the separator 18 and the negative electrode active material layer 24 is in contact with the other side of the separator 18. An electrolytic solution is contained in the positive electrode active material layer 14, the negative electrode active material layer 24, and the separator 18. A lead 60 is connected to an end of the positive electrode current collector 12. A lead 62 is connected to an end of the negative electrode current collector 22. Ends of the leads 60 and 62 extend out of the case 50.

(Positive Electrode)

For the positive electrode current collector 12 of the positive electrode 10, for example, an aluminum foil or the like can be used.

The positive electrode active material layer 14 contains the aforementioned positive electrode active material, a binder, and a conductive material added as necessary. Examples of the conductive material added as necessary include carbon blacks, a carbon material, and a conductive oxide such as ITO.

The binder is not particularly limited and may be a known binder as long as the binder can bind the positive electrode active material and the conductive material to the current collector. The binder may contain, for example, a fluorine resin such as polyvinylidene fluoride (PVDF), polytetrafluoroethylene (PTFE), or a vinylidene fluoride-hexafluoropropylene copolymer.

The positive electrode as above can be manufactured by a known method. For example, the electrode active material containing the aforementioned positive electrode active material, or the positive electrode active material, the binder, and the conductive material are added to a solvent selected according to their kinds (for example, in the case of PVDF, N-methyl-2-pyrrolidone or N, N-dimethylformamide), thereby preparing slurry. This slurry is applied on a surface of the positive electrode current collector 12 and dried. Thus, the positive electrode can be manufactured.

(Negative Electrode)

For the negative electrode current collector 22 of the negative electrode 20, a copper foil or the like can be used.

The negative electrode active material layer 24 may include a negative electrode active material, a conductive material, and a binder. The conductive material is not particularly limited and a known conductive material can be used. Examples of the conductive material include carbon blacks, a carbon material, powder of metal such as copper, nickel, stainless steel, or iron, a mixture of the carbon material and the powder of metal, and a conductive oxide such as ITO. As the binder used for the negative electrode, a known binder can be used without any particular limitation. As the binder, for example, fluorine resin such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), or polyvinyl fluoride (PVF) is given.

Examples of the negative electrode active material include a carbon material capable of intercalating and deintercalating lithium ions, such as graphite, hard carbon, soft carbon, or low temperature heat-treated carbon; a metal capable of forming a composition with lithium, such as Al, Si, or Sn; an amorphous compound mainly containing an oxide, such as $SiO_2$ or $SnO_2$; and particles including $Li_4Ti_5O_{12}$ or the like.

The negative electrode 20 can be manufactured by coating the current collector with the prepared slurry, in a manner similar to the positive electrode 10.

(Electrolytic Solution)

The electrolytic solution is contained inside the positive electrode active material layer 14, the negative electrode active material layer 24, and the separator 18. The electrolytic solution is not particularly limited; for example, in this embodiment, an electrolytic solution containing lithium salt can be used. However, since an electrolytic aqueous solution has a low decomposing voltage electrochemically, the withstanding voltage at the charging is restricted to be low. For this reason, the electrolytic aqueous solution preferably contains organic solvent. As the electrolytic solution, the solution in which lithium salt is dissolved in an organic solvent is preferably used. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of these salts may be used alone or two or more kinds thereof may be used in combination.

Examples of the preferable organic solvent include propylene carbonate, ethylene carbonate, diethyl carbonate, dimethyl carbonate, and methylethyl carbonate. Any of these salts may be used alone or two or more kinds thereof may be mixed at an arbitrary ratio.

In this embodiment, the electrolytic solution is described as an example. However, gel-like electrolyte obtained by adding a gelling agent is also applicable instead of the electrolytic solution. Moreover, instead of the electrolytic solution, a solid electrolyte may be contained.

(Separator)

The separator 18 may be formed of an electrically insulating porous body. The separator 18 may be, for example, a single-layer body or a multilayer body of a film including polyethylene, polypropylene, or polyolefin, an extended film of a mixture of the above resin, or nonwoven fabric including at least one component material selected from the group consisting of cellulose, polyester, and polypropylene.

(Case)

The case 50 is to have the power generating element 30 and the electrolytic solution inside in a sealed state. The case 50 is not particularly limited as long as the leakage of the electrolytic solution to the outside and the intrusion of moisture and the like from the outside to the inside of the lithium ion secondary battery 100 can be suppressed. For example, a metal laminated film obtained by coating a metal foil 52 with a polymer film 54 on each side as depicted in FIG. 1 can be used as the case 50. For example, an aluminum foil can be used as the metal foil 52, and a film of polypropylene or the like can be used as the polymer film (synthetic resin film) 54. For example, as the material of the external polymer film 54, polymer with a high melting point (such as polyethylene terephthalate (PET) or polyamide) is preferable; as the material of the internal polymer film 54, polyethylene, polypropylene, or the like is preferable.

The leads 60 and 62 are formed of a conductive material such as aluminum.

The present positive electrode active material can be used for other electrochemical element than the lithium ion secondary battery. Examples of the electrochemical element include a secondary battery other than the lithium ion secondary battery, such as a metal lithium secondary battery, and an electrochemical capacitor such as a lithium capacitor. These electrochemical elements can be used for the purpose of a power source provided for a self-running micromachine, an IC card, or the like, or a dispersion power source disposed on or within a printed board.

EXAMPLES

The present disclosure is hereinafter described more specifically based on examples and comparative examples; however, the present disclosure is not limited to the following examples.

Example 1

(Hydrothermal Synthesis Step)

First, 23.06 g (0.20 mol) of $H_3PO_4$ (purity of 85%, manufactured by Nacalai Tesque) and 160 g of distilled water (for HPLC, manufactured by Nacalai Tesque) were added to a 500-ml Mayer flask, and stirred with a magnetic stirrer.

Subsequently, 18.38 g (0.10 mol) of $V_2O_5$ (purity of 99%, manufactured by Nacalai Tesque) was added to the flask, and then the materials in the flask were stirred continuously for 2.5 hours. Next, 1.28 g (0.025 mol) of $NH_2NH_2.H_2O$ was dropped into the flask, and the mixture was stirred for one hour. After that, 8.48 g (0.20 mol) of $LiOH.H_2O$ (purity of 99%, manufactured by Nacalai Tesque) was added to the flask in 10 minutes. To the obtained paste-like material, 20 g of distilled water was added. After that, the material in the flask was transferred to a glass cylindrical vessel of an autoclave of 0.5 L content including 20 g of decalin. The vessel was sealed and held at 160° C. for 16 hours, whereby hydrothermal synthesis was performed.

After the material is left and cooled for 8 hours, the resulting material was extracted. The obtained material was separated into slurry and decalin using a syringe and a separatory funnel. The obtained slurry was subjected to heat treatment at 90° C. for 30 hours in an oven, and then crushed, thereby providing 35.58 g of powder.

(Thermal Treatment Step)

The precursor obtained in the hydrothermal synthesis step was put into an alumina crucible, and subjected to heat treatment for 4 hours at 550° C. in a mixture gas atmosphere including 80 vol % of nitrogen gas and 20 vol % of oxygen gas at a flow rate of 2 L per minute.

(Identification of Phase and Measurement of Diffraction Peak Intensity)

Figure 2:
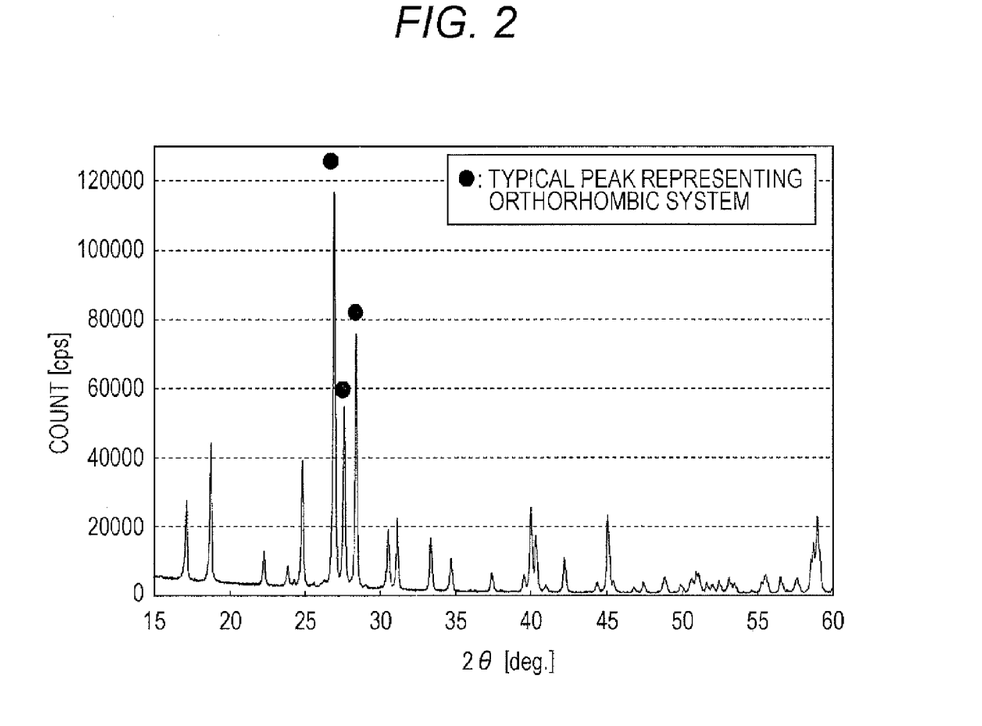
FIG. 2 is a diagram illustrating an X-ray diffraction measurement of a positive electrode active material according to Example 1.

The phase of the positive electrode active material obtained in Example 1 was identified by X-ray diffraction measurement. ULTIMA IV manufactured by Rigaku was used as the X-ray diffraction apparatus. X-ray powder diffraction measurement was performed using CuKα tube in the range of 2θ=10 to 60°. FIG. 2 depicts the X-ray diffraction pattern of the positive electrode active material of Example 1. The orthorhombic system was identified mainly from three peaks with high intensity. The peak positions are 2θ=26.9±0.5° (201), 27.5±0.5° (102), and 28.3±0.5°. On the other hand, the triclinic system was similarly identified mainly from three peaks with high intensity. The peak positions are 2θ=18.3±0.5°, 27.3±0.5°, and 29.7±0.5°. Based on the obtained diffraction patterns, the phase was identified. As a result, the phase of the positive electrode active material of Example 1 was the single phase of the orthorhombic system. Using the X-ray diffraction pattern, the diffraction peak intensity of (201)-plane having a peak around 2θ=26.9±0.5° and the diffraction peak intensity of (102)-plane having a peak around 2θ=27.5±0.5° were measured; then, the diffraction peak intensity ratio (I (201)/I (102)) was calculated. Table 1 represents the results thereof along with the results from other examples. It has been confirmed that the analysis results of the positive electrode active material obtained in the examples are the same as the analysis results of the positive electrode active material obtained by decomposing a completed lithium ion secondary battery.

(Valence Analysis)

The positive electrode active material $LiVOPO_4$ obtained in Example 1 was dissolved in acid and the material was titrated using ferrous sulfate ammonium, and then the amount of tetravalent V of the positive electrode active material was calculated based on the titration amount thereof. Table 1 represents the results thereof along with the results from other examples. The amount of tetravalent V was 27.7 mass %, and the amount of pentavalent V was 2.3 mass % in the positive electrode active material obtained in Example 1. It has been confirmed that the analysis results of the valence of the positive electrode active material obtained in the examples are the same as the analysis results of the valance of the positive electrode active material obtained by decomposing a completed lithium ion secondary battery.

(Manufacture of Positive Electrode)

The positive electrode active material of Example 1, polyvinylidene fluoride (PVDF) as a binder, and acetylene black were mixed and dispersed in the solvent, N-methyl-2-pyrrolidone (NMP), thereby preparing slurry. Note that the slurry was adjusted so that the mass ratio among the positive electrode active material, acetylene black, and PVDF was 84:8:8. This slurry was applied onto the aluminum foil as the positive electrode current collector, and dried and rolled, thereby providing the positive electrode having the active material layer containing the positive electrode active material of Example 1.

(Manufacture of Negative Electrode)

Slurry for a negative electrode was prepared by a method similar to the coating for the positive electrode except that graphite was used instead of the active material of Example 1 and that only carbon black was used as the conductive auxiliary agent. This slurry was applied onto the copper foil as the negative electrode current collector, and dried and rolled, thereby providing the negative electrode having the active material layer containing the negative electrode active material, (Manufacture of Lithium Ion Secondary Battery)

The positive electrode and the negative electrode prepared as above and the separator including the polyethylene porous film were count into a predetermined size. These were stacked in the order of the negative electrode, the separator, the positive electrode, the separator, and the negative electrode until the negative electrodes were stacked in four layers and the positive electrodes were stacked in three layers. This multilayer body and 1 M of $LiPF_6$ solution as the electrolytic solution were put into an aluminum laminated package. Then, the aluminum laminated package was sealed to vacuum. Thus, the lithium ion secondary battery including the positive electrode active material of Example 1 was completed.

(Measurement of Discharge Capacity and Rate Characteristic)

The discharge capacity (unit: mAh/g) of the lithium ion secondary battery of Example 1 in the case where the discharging rate was 1 C (current value at which, when the constant-current discharging is performed at 25° C., the discharging ends in 10 hours) was measured. Additionally, the discharge capacity in the case where the discharging rate was 1 C (current value at which, when the constant-current discharging is performed at 25° C., the discharging ends in an hour) was measured. The ratio (%) of discharge capacity at 1 C relative to the discharge capacity (100%) at 0.1 C was obtained as the rate characteristic. Note that the battery having a discharge capacity of 135 mAh/g or more at 0.1 C and a rate characteristic of 63% or more is marked as "G" (good). The battery having a discharge capacity of less than 135 mAh/g at 0.1 C or a rate characteristic of less than 63% is marked as "NA" (not available). Table 1 represents the results thereof along with the results from other examples.

Example 2

The mixing ratio of the atmosphere gas in the heat treatment step was set to 90 vol % of nitrogen gas and 10 vol % of oxygen gas. The flow rate of the atmosphere gas was set to 2 L per minute, and the heat treatment was performed at 575° C. for four hours, thereby providing a positive electrode active material of Example 2. In the positive electrode active material obtained in Example 2, the amount of tetravalent V was 27.8 mass % and the amount of pentavalent V was 2.2 mass %.

Example 3

The mixing ratio of the atmosphere gas in the heat treatment step was set to 70 vol % of nitrogen gas and 30 vol % of oxygen gas. The flow rate of the atmosphere gas was set to 2 L per minute, and the heat treatment was performed at 525° C. for four hours, thereby providing a positive electrode active material of Example 3. In the positive electrode active material obtained in Example 3, the amount of tetravalent V was 27.9 mass % and the amount of pentavalent V was 2.1 mass %.

Example 4

The mixing ratio of the atmosphere gas in the heat treatment step was set to 60 vol % of nitrogen gas and 40 vol % of oxygen gas. The flow rate of the atmosphere gas was set to 2 L per minute, and the heat treatment was performed at 525° C. for four hours, thereby providing a positive electrode active material of Example 4. In the positive electrode active material obtained in Example 4, the amount of tetravalent V was 28.0 mass % and the amount of pentavalent V was 2.0 mass %.

Example 5

By performing the heat treatment step after adding 3 mass % or carbon to the precursor obtained through the hydrothermal synthesis step, a positive electrode active material of Example 5 was obtained. The mixing ratio of the atmosphere gas in the heat treatment step was set to 75 vol % of nitrogen gas and 25 vol % of oxygen gas. The flow rate of the atmosphere gas was set to 2 L per minute, and the heat treatment was performed at 550° C. for four hours. In the positive electrode active material obtained in Example 5, the amount of tetravalent V was 28.1 mass % and the amount of pentavalent V was 1.9 mass %.

Example 6

The mixing ratio of the atmosphere gas in the heat treatment step was set to 50 vol % of nitrogen gas and 50 vol % of oxygen gas. The flow rate of the atmosphere gas was set to 2 L per minute, and the heat treatment was performed at 550° C. for four hours, thereby providing a positive electrode active material of Example 6. In the positive electrode active material obtained in Example 6, the amount of tetravalent V was 28.1 mass % and the amount of pentavalent V was 1.9 mass %.

Example 7

The mixing ratio of the atmosphere gas in the heat treatment step was set to 65 vol % of nitrogen gas and 35 vol % of oxygen gas. The flow rate of the atmosphere gas was set to 2 L per minute, and the heat treatment was performed at 575° C. for four hours, thereby providing a positive electrode active material of Example 7. In the positive electrode active material obtained in Example 7, the amount of tetravalent V was 28.2 mass % and the amount of pentavalent V was 1.8 mass %.

Example 8

By performing the heat treatment step after adding 1 mass % of carbon to the precursor obtained through the hydrothermal synthesis step, a positive electrode active material of Example 8 was obtained. The mixing ratio of the atmosphere gas in the heat treatment step was set to 75 vol % of nitrogen gas and 25 vol % of oxygen gas. The flow rate of the atmosphere gas was set to 2 L per minute, and the heat treatment was performed at 550° C. for four hours. In the positive electrode active material obtained in Example 8, the amount of tetravalent V was 28.2 mass % and the amount of pentavalent V was 1.8 mass %.

Comparative Example 1

Figure 3:
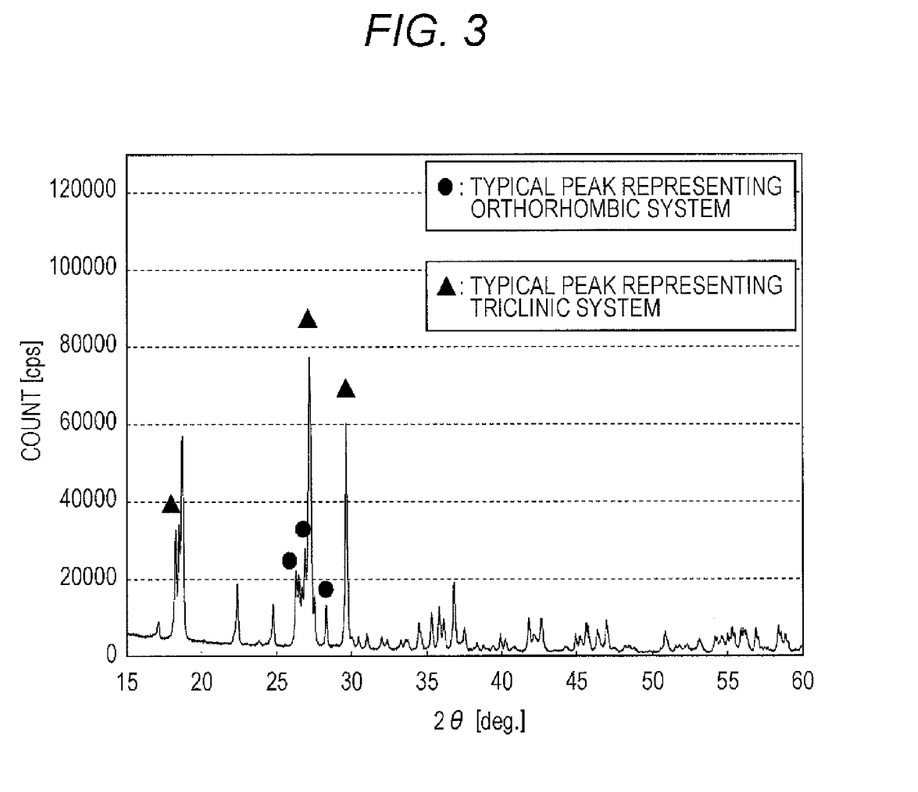
FIG. 3 is a diagram illustrating an X-ray diffraction measurement of a positive electrode active material according to Comparative Example 1.

After vacuuming the chamber having the air atmosphere until the pressure becomes $10^2$ Pa, the heat treatment step was performed at 550° C. for four hours, thereby providing a positive electrode active material of Comparative Example 1. FIG. 3 depicts the X-ray diffraction pattern of the positive electrode active material of Comparative Example 1. From the obtained diffraction pattern, the phase was identified. As a result, the phase of the positive electrode active material of Comparative Example 1 was proved to be a phase in which the orthorhombic system and the triclinic system were present in a mixed state. In the positive electrode active material obtained in Comparative Example 1, the amount of tetravalent V was 27.4 mass % and the amount of pentavalent V was 2.6 mass %.

Comparative Example 2

The mixing ratio of the atmosphere gas in the heat treatment step was set to 100 vol % of nitrogen gas and 0 vol % of oxygen gas. The flow rate of the atmosphere gas was set to 2 L per minute, and the heat treatment was performed at 525° C. for four hours, thereby providing a positive electrode active material of Comparative Example 2. In The positive electrode active material obtained in Comparative Example 2, the amount of tetravalent V was 27.5 mass % and the amount of pentavalent V was 2.5 mass %.

Comparative Example 3

The mixing ratio of the atmosphere gas in the heat treatment step was set to 95 vol % of nitrogen gas and 5 vol % of oxygen gas. The flow rate of the atmosphere gas was set to 2 L per minute, and the heat treatment was performed at 575° C. for four hours, thereby providing a positive electrode active material of Comparative Example 3. In the positive electrode active material obtained in Comparative Example 3, the amount of tetravalent V was 27.6 mass % and the amount of pentavalent V was 2.4 mass %.

Comparative Example 4

The mixing ratio of the atmosphere gas in the heat treatment step was set to 25 vol % of nitrogen gas and 75 vol % of oxygen gas. The flow rate of the atmosphere gas was set to 2 L per minute, and the heat treatment was performed at 550° C. for four hours, thereby providing a positive electrode active material of Comparative Example 4. In the positive electrode active material obtained in Comparative Example 4, the amount of tetravalent V was 28.3 mass % and the amount of pentavalent V was 1.7 mass %.

Comparative Example 5

The mixing ratio of the atmosphere gas in the heat treatment step was set to 0 vol % of nitrogen gas and 100 vol % of oxygen gas. The flow rate of the atmosphere gas was set to 2 L per minute, and the heat treatment was performed at 525° C. for four hours, thereby providing a positive electrode active material of Comparative Example 5. In the positive electrode active material obtained in Comparative Example 5, the amount of tetravalent V was 28.4 mass % and the amount of pentavalent V was 1.6 mass %.

Comparative Example 6

The mixing ratio of the atmosphere gas in the heat treatment step was set to 15 vol % of nitrogen gas and 85 vol % of oxygen gas. The flow rate of the atmosphere gas was set to 2 L per minute, and the heat treatment was performed at 550° C. for four hours, thereby providing a positive electrode active material of Comparative Example 6. In the positive electrode active material obtained in Comparative Example 6, the amount of tetravalent V was 28.5 mass % and the amount of pentavalent V was 1.5 mass %.

Comparative Example 7

The mixing ratio of the atmosphere gas in the heat treatment step was set to 5 vol % of nitrogen gas and 95 vol % of oxygen gas. The flow rate of the atmosphere gas was set to 2 L per minute, and the heat treatment was performed at 575° C. for four hours, thereby providing a positive electrode active material of Comparative Example 7. In the positive electrode active material obtained in Comparative Example 7, the amount of tetravalent V was 28.6 mass % and the amount of pentavalent V was 1.4 mass %.

Comparative Example 8

The mixing ratio of the atmosphere gas in the heat treatment step was set to 0 vol % of nitrogen gas and 100 vol % of oxygen gas. The flow rate of the atmosphere gas was set to 2 L per minute, and the heat treatment was performed at 575° C. for 20 hours, thereby providing a positive electrode active material of Comparative Example 8. In the positive electrode active material obtained in Comparative Example 8, the amount of tetravalent V was 30.0 mass % and the amount of pentavalent V was 0 mass %.

Comparative Example 9

In Comparative Example 9, a positive electrode active material was synthesized using a solution method. In other words, a raw material aqueous solution containing $LiNO_3$, $V_2O_5$, and $H_3PO_4$ at a molar ratio of 2:1:2 was stirred while being heated, and then dried; after that, the resulting product was sintered for 14 hours at 600° C. in air, thereby providing the positive electrode active material of Comparative Example 9. In the positive electrode active material obtained in Comparative Example 9, the amount of tetravalent V was 30.0 mass % and the amount of pentavalent V was 0 mass %.

The discharge capacity and rate characteristic of the batteries obtained according to Examples 2 to 8 and Comparative Examples 1 to 9 were evaluated by a method similar to the method of Example 1 except for the method of synthesizing the positive electrode active material. The results are shown in Table 1.

TABLE 1

| | Amount of tetravalent V [mass %] | Peak intensity ratio (201)/(102) — | Discharge capacity at 0.1 C mAh/g | Rate characteristic % | Evaluation | Phase — |
|---|---|---|---|---|---|---|
| Comparative Example 1 | 27.4 | 2.4 | 122 | 71.5 | NA | orthorhombic system/triclinic system (mixed phase) |
| Comparative Example 2 | 27.5 | 2.4 | 121 | 72.3 | NA | orthorhombic system/triclinic system (mixed phase) |
| Comparative Example 3 | 27.6 | 2.4 | 129 | 66.9 | NA | orthorhombic system (single phase) |
| Example 1 | 27.7 | 2.3 | 137 | 65.9 | G | orthorhombic system (single phase) |
| Example 2 | 27.8 | 2.3 | 139 | 67.2 | G | orthorhombic system (single phase) |
| Example 3 | 27.9 | 2.2 | 138 | 66.3 | G | orthorhombic system (single phase) |
| Example 4 | 28.0 | 2.3 | 140 | 64.3 | G | orthorhombic system (single phase) |
| Example 5 | 28.1 | 2.2 | 138 | 63.2 | G | orthorhombic system (single phase) |
| Example 6 | 28.1 | 2.2 | 140 | 64.2 | G | orthorhombic system (single phase) |
| Example 7 | 28.2 | 2.3 | 139 | 63.9 | G | orthorhombic system (single phase) |
| Example 8 | 28.2 | 2.2 | 137 | 63.4 | G | orthorhombic system (single phase) |
| Comparative Example 4 | 28.3 | 2.0 | 139 | 58.7 | NA | orthorhombic system (single phase) |
| Comparative Example 5 | 28.4 | 2.1 | 137 | 57.8 | NA | orthorhombic system (single phase) |
| Comparative Example 6 | 28.5 | 2.0 | 139 | 57.8 | NA | orthorhombic system (single phase) |
| Comparative Example 7 | 28.6 | 1.9 | 140 | 58.4 | NA | orthorhombic system (single phase) |
| Comparative Example 8 | 30.0 | 1.6 | 136 | 53.6 | NA | orthorhombic system (single phase) |
| Comparative Example 9 | 30.0 | 1.5 | 121 | 51.0 | NA | orthorhombic system (single phase) |

As is evident from Table 1, the lithium ion secondary batteries of Examples 1 to 8 showed advantageous effects of the present disclosure, high discharge capacities and excellent rate characteristics. These effects may be due to deintercalation/intercalation of Li from/in the positive electrode active material facilitated as a result of distortion of the crystal structure of the positive electrode active material containing V other than tetravalent V. On the other hand, in Comparative Examples 1 and 2, the resulting positive electrode active materials had their own crystal phases each provided as a mixture of the orthorhombic system and the triclinic system. Thus, the desired discharge capacity was not obtained. In Comparative Example 3, the triclinic system was not confirmed in the X-ray diffraction pattern. However, the desired discharge capacity was not obtained because the microscopic structure might be changed in the positive electrode active material. Further, in Comparative Examples 4 to 9, since the amount of tetravalent V was too large in the positive electrode active material, the desired rate characteristic was not obtained.

Since the present disclosure contributes to the lithium ion secondary battery in addition to the positive electrode active material having high discharge capacity and excellent positive electrode active material, the present disclosure has industrial applicability.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode active material containing a compound represented by a chemical formula $LiVOPO_4$, wherein a crystal system of the compound is an orthorhombic system, and the amount of tetravalent V of the compound is 27.7 mass % or more and 28.2 mass % or less.

2. The positive electrode active material according to claim 1, wherein the amount of tetravalent V of the compound is 27.7 mass % or more and 27.9 mass % or less.

3. The positive electrode active material according to claim 1, wherein an average primary particle size is 0.05 μm or more and 1 μm or less.

4. A lithium ion secondary battery comprising a positive electrode containing the positive electrode active material according to claim 1.

5. The positive electrode active material according to claim 1, wherein the diffraction peak intensity ratio (I (201)/I (102)) is 2.2 or more and 2.3 or less, I (201) being the peak intensity obtained from (201)-plane existing in $2\theta=26.9\pm0.5$ in the X-ray diffraction measurement in which Cu—Kα ray is used and I (102) being the peak intensity obtained from (102)-plane existing in $2\theta=27.5\pm0.5$.

6. The positive electrode active material according to claim 1, wherein the amount of pentavalent V of the compound is 1.8 mass % or more and 2.3 mass % or less.

* * * * *